United States Patent
Greber

[11] Patent Number: 6,052,897
[45] Date of Patent: Apr. 25, 2000

[54] COMPRESSOR-WHEEL ARRANGEMENT FOR TURBOCHARGERS

[75] Inventor: Jürg Greber, Wettingen, Switzerland

[73] Assignee: Asea Brown Boveri AG, Baden, Switzerland

[21] Appl. No.: 08/912,985

[22] Filed: Aug. 12, 1997

[30] Foreign Application Priority Data

Oct. 2, 1996 [DE] Germany ............ 196 40 647

[51] Int. Cl.[7] ............................................. B23P 15/00
[52] U.S. Cl. ............................................. 29/889.2; 29/889
[58] Field of Search ............................... 29/889.2, 889, 29/428; 417/407

[56] References Cited

U.S. PATENT DOCUMENTS

| | | | |
|---|---|---|---|
| 2,441,432 | 5/1948 | McGee | 230/134 |
| 5,176,497 | 1/1993 | Deacon et al. | |
| 5,193,989 | 3/1993 | Fleury et al. | |
| 5,209,595 | 5/1993 | Hyll | 403/13 |

FOREIGN PATENT DOCUMENTS

| | | |
|---|---|---|
| 0395826 | 11/1990 | European Pat. Off. |
| 4330380A1 | 3/1995 | Germany |
| 4444082A1 | 6/1996 | Germany |
| WO93/02278 | 2/1993 | WIPO |

*Primary Examiner*—I Cuda
*Attorney, Agent, or Firm*—Burns, Doane, Swecker & Mathis, L.L.P.

[57] ABSTRACT

The object is to provide a novel compressor-wheel arrangement for turbochargers, the compressor-wheel fastening of which is designed to be especially robust but nonetheless easily releasable. A simplified mounting/dismantling method and a corresponding method are specified for this purpose.

4 Claims, 4 Drawing Sheets

COMPRESSOR-WHEEL ARRANGEMENT FOR TURBOCHARGERS

BACKGROUND OF THE INVENTION

1. Field of the Invention

The invention relates to a compressor-wheel arrangement for turbochargers, in particular for exhaust-gas turbochargers, including a mounting/dismantling device and method.

2. Discussion of Background

Exhaust-gas turbochargers mainly comprise a casing having an integrated exhaust-gas turbine and a corresponding compressor, the exhaust-gas turbine and the compressor usually being arranged on a common shaft. An important precondition for the function of the exhaust-gas turbochargers is a rotationally locked shaft/hub connection on both the turbine side and the compressor side. Such a connection can be realized either in a frictional or positive-locking manner.

Frictional connections can be produced, for example, by pressing or shrinking the hub onto the shaft. However, such an operation requires a relatively large amount of work. In order to be able to take action in the interior of the turbochargers at an appropriate point in the event of both the repair and maintenance of the turbochargers, the latter must be largely dismantled and at the same time the shaft/hub connections must also frequently be released. However, this clearly increases the amount of effort required for maintenance and repair work. Therefore a considerably longer stoppage, i.e. withdrawal from service, of the internal combustion engine connected to the turbocharger can be expected.

U.S. Pat No. 5,193,989 discloses a positive-locking shaft/hub connection for the compressor wheel of a turbocharger. To this end, the compressor wheel has on the turbine side a fastening socket having a blind hole and an integrated internal thread which is screwed to the thread end of the turbocharger shaft. Formed in each case on both sides of the internal thread is a guide surface which corresponds with a corresponding guide surface of the thread end. In this solution, the zone of greatest stress concentration, which for every compressor wheel is located in the region of its greatest radial extent, is not weakened by a hole used for the fastening. Since the shaft/hub connection is therefore arranged outside the zone at risk, an especially robust fastening of the compressor wheel is achieved.

However, this advantageous fastening of the compressor wheel results in disadvantages during the mounting or dismantling. Since no access to the turbine side is possible in a turbocharger connected to an internal combustion engine, the requisite counter torque for detaching or fastening the compressor wheel cannot be applied. Consequently, the turbocharger components can neither be mounted nor dismantled from the compressor side. In order to maintain or repair it, the turbocharger, including the attached gas lines, must therefore be detached from the internal combustion engine. However, such a procedure requires a great deal of work and therefore leads to a longer withdrawal from service of the internal combustion engine connected to the turbocharger.

In contrast, a number of compressor-wheel arrangements for turbochargers are known (see, for example, DE-A1 43 30 380) in which the compressor wheel has a hub with a continuous bore. The turbocharger shaft reaching through the bore has a threaded end on which a nut serving to axially restrain the compressor wheel is guided. In these solutions, however, the shaft/hub connection is formed in the zone of greatest stress concentration. Widening of the hub bore and thus release of the shaft/hub connection may occur, in particular at high rotational speeds of the turbocharger. Accordingly, reliable fastening of the compressor wheel is not ensured in the long run.

SUMMARY OF THE INVENTION

Accordingly, one object of the invention, in attempting to avoid all these disadvantages, is to provide a novel compressor-wheel arrangement for turbochargers, the compressor-wheel fastening of which is designed to be especially robust but nonetheless easily releasable. A simplified mounting/dismantling method and a corresponding device are to be specified for this purpose.

This is achieved according to the invention in that, in a device according to the preamble of claim 1, the hub has a turbine-side fastening socket having an integrated internal thread. The internal thread corresponds with the fastening thread of the shaft end. A guide surface is formed in each case on both sides of the internal thread and of the fastening thread. The guide surfaces of the fastening socket correspond with the guide surfaces of the shaft end. The compressor casing comprises at least one air-inlet-side casing part and at least one air-outlet-side casing part. A plurality of fastening elements are releasably arranged between both casing parts. A first locating feature for a device for mounting/dismantling the compressor wheel is arranged on the shaft end, a second locating feature for said device is arranged on the compressor wheel, and a third locating feature for said device is arranged on the air-outlet-side casing part.

This compressor-wheel arrangement provides a shaft/hub connection which is robust, since it is arranged outside the zone of greatest stress concentration, and is releasable from the compressor side. In this case, the internal thread of the fastening socket and the fastening thread of the shaft end perform the function of holding the compressor wheel on the shaft, and the guide surfaces corresponding to one another provide for the requisite concentricity of shaft and compressor wheel. On account of the design of the guide surfaces corresponding with one another, the reproducibility of the residual unbalance values is also ensured in such a compressor wheel having a continuous bore. Consequently, the working time required to exchange the compressor wheel can be shortened and therefore the requisite stoppage time of the turbocharger can be reduced.

It is especially advantageous if the first locating feature is designed as an external hexagon arranged on the shaft end, the second locating feature is designed as a hexagon arranged on the end of the hub opposite the fastening socket, and the third locating feature is designed as a plurality of tapped holes in the air-outlet-side casing part. The detachability of the compressor wheel from the compressor side is thereby realized with relatively simple means.

A mounting/dismantling device consisting of a mounting plate, the locking device and the turning device is provided in order to exchange the compressor wheel. To this end, the mounting plate has a plurality of fastening holes in its radially outer region for the air-outlet-side casing part of the compressor as well as a central recess for accommodating the locking device and the turning device. A bush for accommodating the locking device in the mounting plate is fastened in the central recess.

During the dismantling of the compressor wheel, first of all the fastening elements connecting the air-outlet-side casing part and the air-inlet-side casing part are released and the air-inlet-side casing part is removed. Then the mounting plate is fastened to the air-outlet-side casing part. The compressor wheel is then locked against rotation about its axis by means of the locking device. Then the shaft/hub connection is released by means of the turning device. The mounting plate is then separated from the air-outlet-side casing part, and in the process both the locking device and the turning device are pulled off the compressor wheel. As a last step of the dismantling, the compressor wheel is removed. Depending on requirement, either a new compressor wheel can then be inserted, the mounting of which is effected in the reverse order of the dismantling steps of the method, or the turbocharger can be dismantled further from the compressor side.

The essential advantage of this solution lies in the fact that, despite an improved shaft/hub connection, the connection between the internal combustion engine and the turbocharger does not have to be released in order to mount/dismantle the compressor wheel. The maintenance or repair of the turbocharger is thereby substantially simplified and the internal combustion engine connected to it achieves clearly improved availability.

Of course, the components of the turbocharger which are arranged further on the inside, such as the shaft bearings for example, are also accessible after the compressor wheel has been dismantled. Accordingly, they can likewise be checked and/or removed without having to detach the turbocharger from the internal combustion engine for this purpose.

It is especially expedient if the shaft end is arranged in the region of the fastening socket. Since in this solution the entire shaft/hub connection lies outside the zone of greatest stress concentration, a very reliable and durable fastening of the compressor wheel is achieved.

As an alternative to this, the shaft end is arranged at the region of the hub opposite the fastening socket. The turning device serving to detach or fasten the compressor wheel can thereby be designed to be substantially shorter, which simplifies the mounting or the dismantling of the compressor wheel.

Furthermore, it is advantageous if the shaft end is arranged between the region of the fastening socket and the region of the hub opposite the fastening socket. This design combines the advantages of the aforesaid solutions and reduces their respective disadvantages.

Finally, the turning device is advantageously connected to a step-up gear on its side remote from the hub, and a lifting and transporting device is fastened to the mounting plate. The mounting/dismantling of larger turbochargers is thereby substantially facilitated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings of an exhaust-gas turbocharger having an internal bearing arrangement, wherein.

Figure 1:
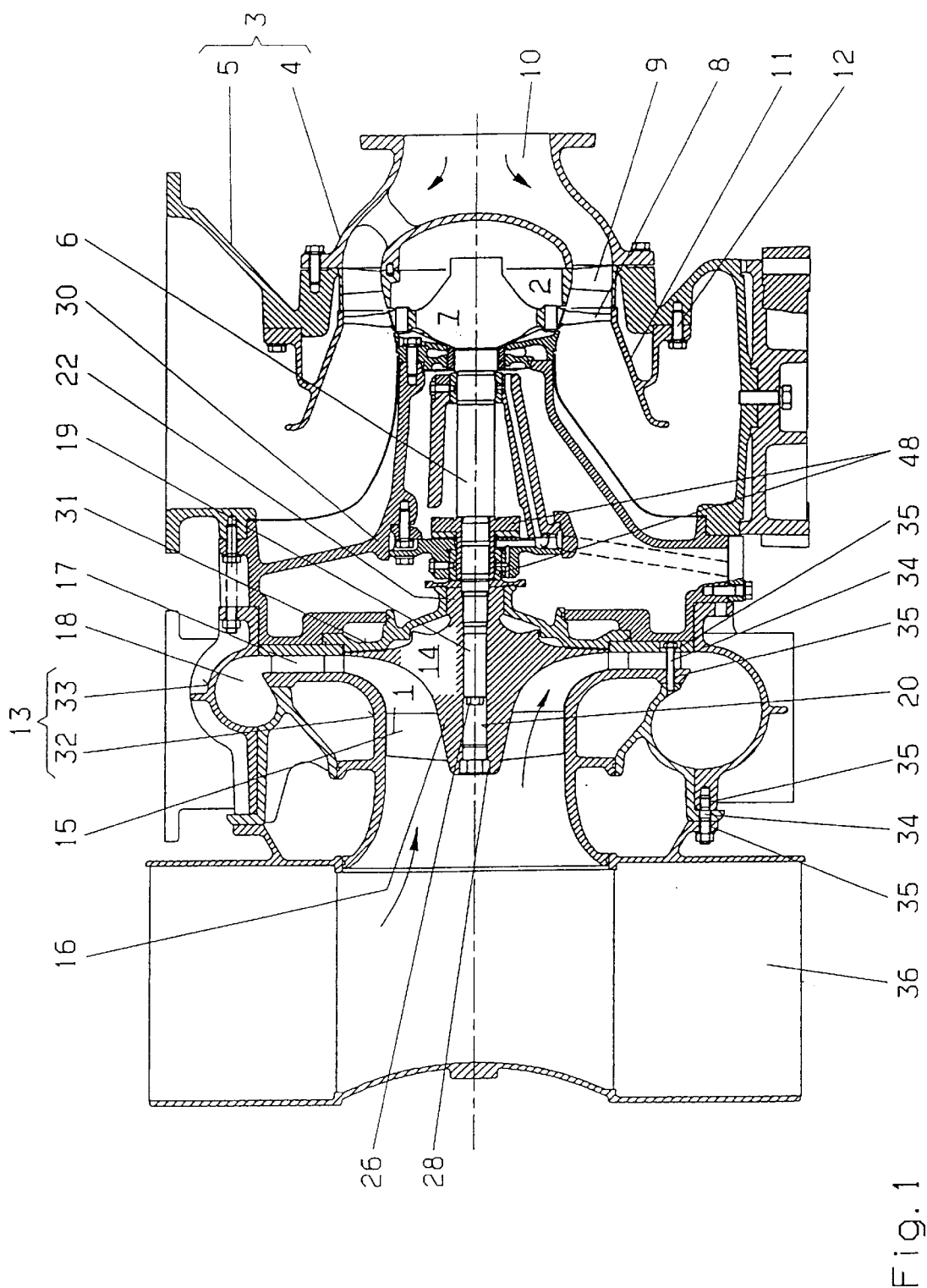
FIG. 1 shows a longitudinal section of the exhaust-gas turbocharger.

Only the elements essential for understanding the invention are shown. Elements of the plant which are not shown are, for example, the internal combustion engine connected to the exhaust-gas turbocharger and the corresponding connecting lines. The direction of flow of the working media is designated by arrows.

DESCRIPTION OF THE PREFERRED EMBODIMENTS

Referring now to the drawings, wherein like reference numerals designate identical or corresponding parts throughout the several views, the exhaust-gas turbocharger consists of a compressor 1 and an exhaust-gas turbine 2. Arranged on the turbine side 2 is a casing 3 which is formed by a gas-inlet casing 4 and a gas-outlet casing 5. A turbine wheel 7 carried by a turbocharger shaft 6 and having moving blades 8 is rotatably mounted in the turbine casing 3. A nozzle ring 9 is arranged upstream of the moving blades 8. The gas-inlet casing 4 has a flow passage 10, which receives the exhaust gases of an internal combustion engine (not shown), connected to the exhaust-gas turbocharger and designed as a diesel engine, and directs them further to the turbine wheel 7. The latter is defined on the outside by a turbine diffuser 11, which in turn is fastened to the gas-outlet casing 5 by screws 12.

The compressor 1 of the exhaust-gas turbocharger is designed as a radial compressor. It consists of a compressor casing 13 in which a compressor wheel 14 is rotatably mounted on the turbocharger shaft 6. The compressor wheel 14 has a hub 16 fitted with a multiplicity of moving blades 15. A radially arranged, bladed diffuser 17 follows downstream of the moving blades 15, which diffuser 17 in turn leads into a spiral 18 of the radial compressor (FIG. 1).

Figure 2:
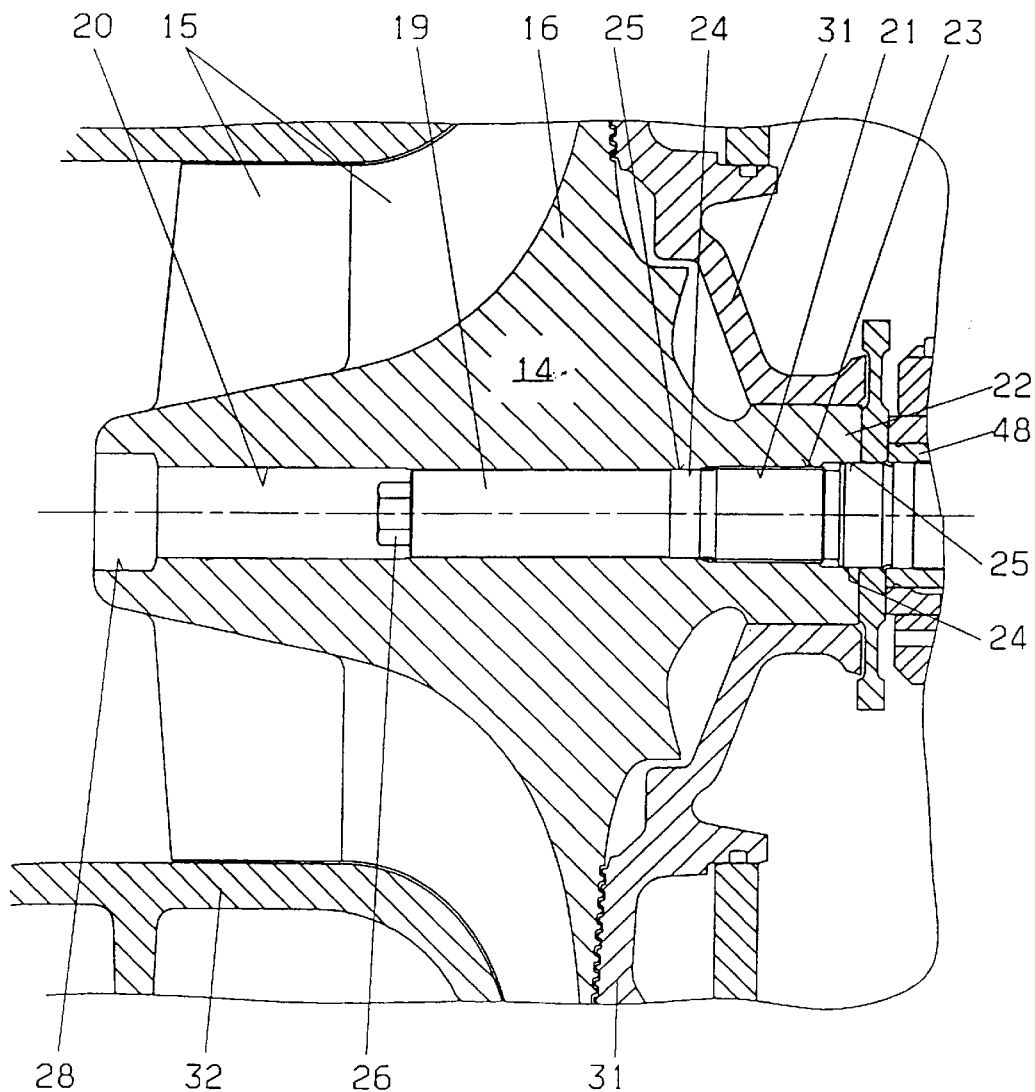
FIG. 2 shows an enlarged representation of FIG. 1 in the region of the shaft/hub connection of the compressor wheel.
Figure 3:
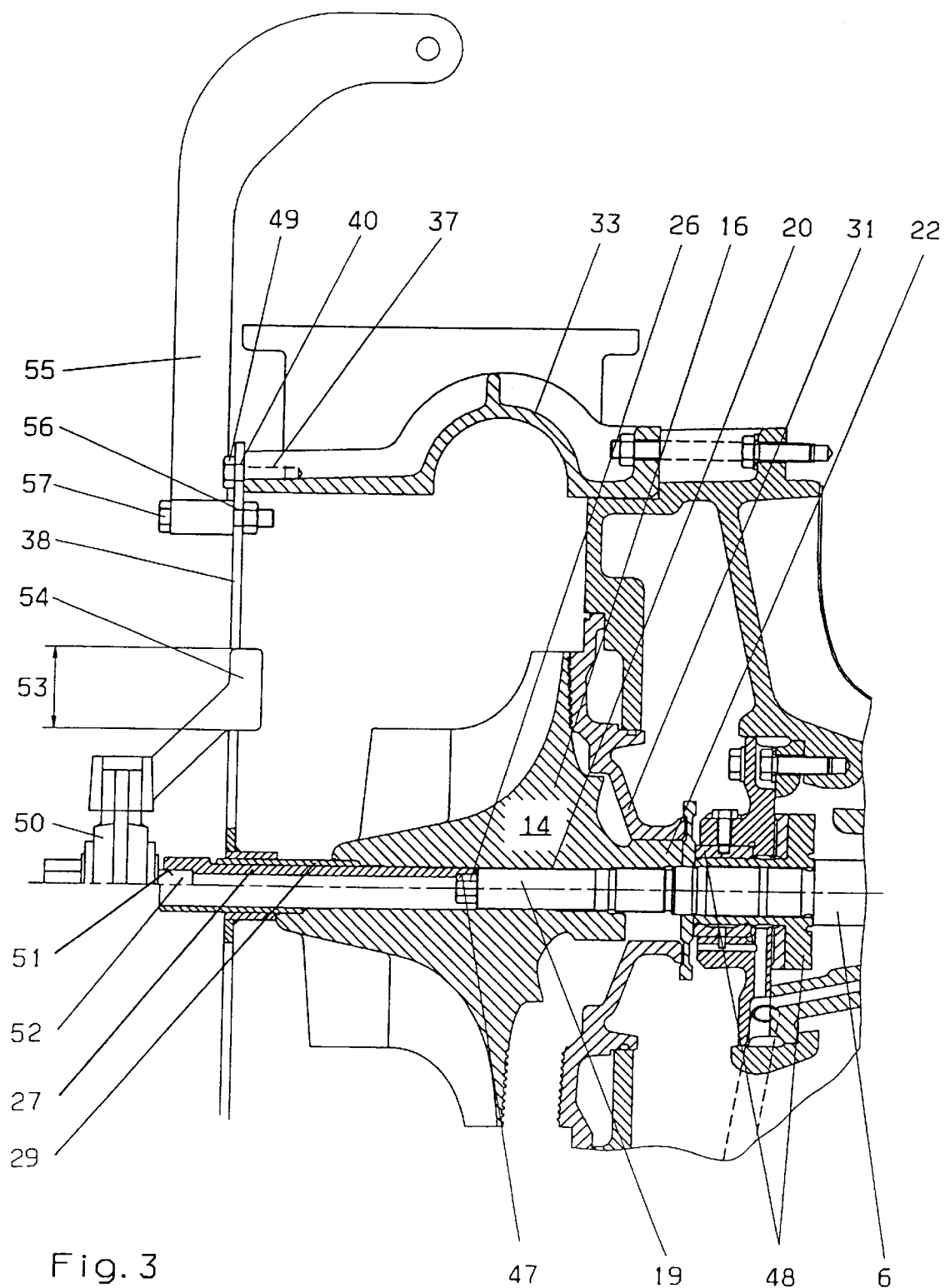
FIG. 3 shows a representation of the connection between compressor wheel and mounting/dismantling device, the compressor wheel being shown at the top in the mounted state and at the bottom in the state detached from the turbine shaft.

A central through-bore 20 accommodating a shaft end 19 of the turbocharger shaft 6 is formed in the hub 16. A fastening thread 21 for the hub 16 is arranged on the shaft end 19. On the turbine side, the hub 16 has a fastening socket 22 having an internal thread 23. The shaft end 19 is arranged between the region of the fastening socket 22 and the region of the hub 16 opposite the fastening socket 22 (FIG. 2). Of course, the shaft end 19 may also be arranged in the region of the fastening socket 22 or at the region of the hub 16 opposite the fastening socket 22 (not shown). Its fastening thread 21 is formed so as to correspond with the internal thread 23 of the fastening socket 22. A guide surface 24, 25 is formed in each case on both sides of the internal thread 23 and of the fastening thread 21, the guide surfaces 24 of the fastening socket 22 corresponding with the guide surfaces 25 of the shaft end 19. A first locating feature 26, designed as an external hexagon, for a turning device 27 is arranged on the shaft end 19, and a second locating feature 28, designed as an internal hexagon of the hub 16, for a locking device 29 is arranged on the compressor wheel 14 (FIG. 2, FIG. 3). Of course, given an appropriate design of the components, the first locating feature 26 may also be arranged on the compressor wheel 14 and the second locating feature 28 may also be arranged on the shaft end 19 (likewise not shown).

The exhaust-gas turbocharger has an internal bearing arrangement, i.e. a bearing housing 30, in which the turbocharger shaft 6 is rotatably mounted, is arranged between the turbine casing 3 and the compressor casing 13. The bearing housing 30 and the compressor casing 13 are separated from one another by means of an intermediate wall 31. The intermediate wall 31 accommodates the fastening socket 22 of the hub 16 of the compressor wheel 14 and is sealed off from the hub 16. The compressor casing 13 consists of an air-inlet-side casing part 32 and an air-outlet-side casing part 33. Both casing parts 32, 33 are detachably connected to one another by means of a plurality of fastening elements 34 designed as screws. To this end, corresponding recesses 35 designed as holes are arranged in the casing parts 32, 33. The air-inlet-side casing part 32 is connected to a filter muffler 36 (FIG. 1). A third locating feature 37 designed as a tapped hole for a mounting plate 38 is arranged on the air-outlet-side casing part 33 (FIG. 3). Of course, the holes 35 arranged in the air-outlet-side casing part 33 may also be designed as a third locating feature 37. Thus these holes 35 can advantageously be used in two ways and the need for a separate, third locating feature 37 is dispensed with.

Figure 4:
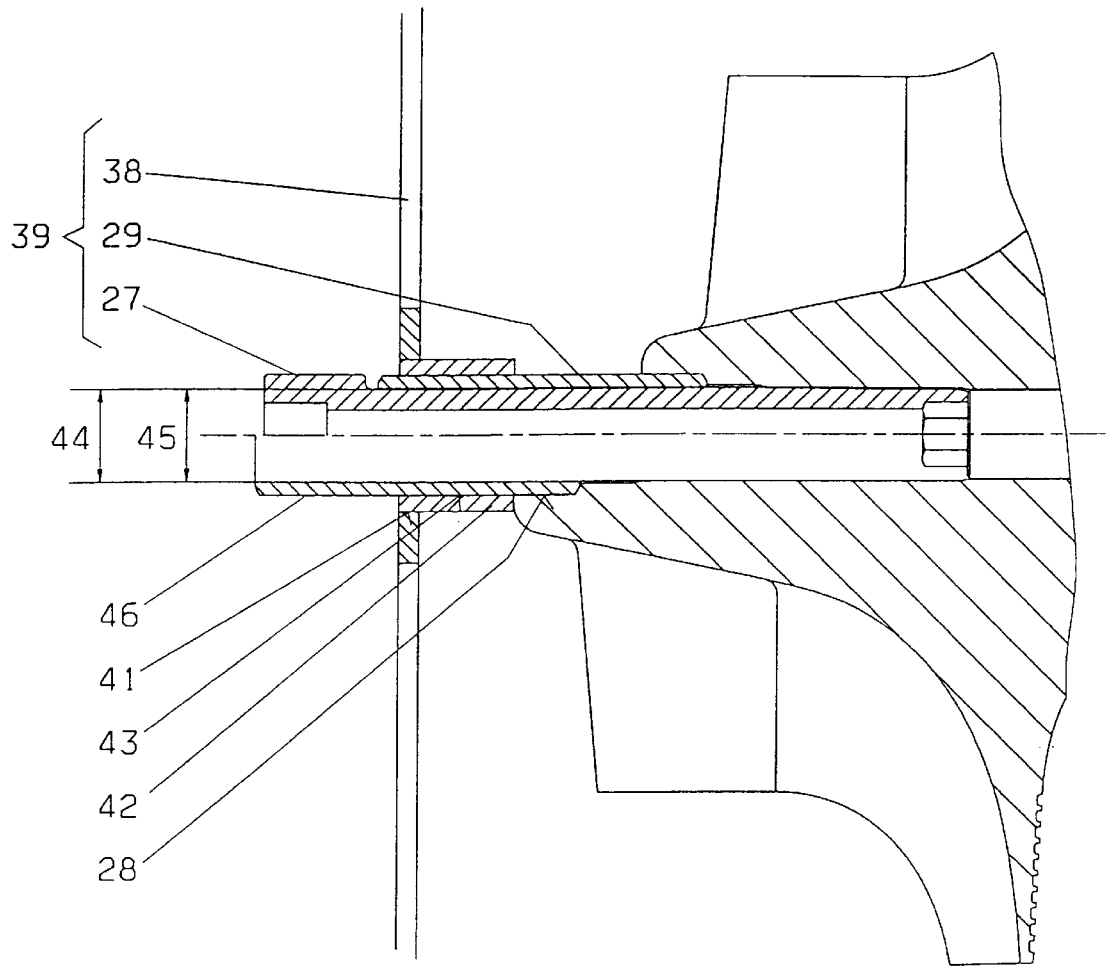
FIG. 4 shows an enlarged detail of FIG. 3 in the region of the connection between compressor wheel and mounting/dismantling device.

The turning device 27, the locking device 29 and the mounting plate 38 together form a mounting/dismantling device 39 for the compressor wheel 14 (FIG. 3, FIG. 4). Here, the locking device 29 is designed as a locking sleeve and the turning device 27 is designed as a socket wrench. In its radially outer region, the mounting plate 38 has a plurality of fastening holes 40 which serve to connect it to the air-outlet-side casing part 33 of the compressor wheel 14. In addition, it has a central recess 41 in which a bush 42 is fastened and provided with an internal hexagon 43. The locking sleeve 29 has an inside diameter 44 and the socket wrench 27 has an outside diameter 45. The latter is designed to be smaller than the inside diameter 44 of the locking sleeve 29, so that the socket wrench 27 can be rotatably arranged in the locking sleeve 29. The outer surface of the locking sleeve 29 is provided with an external hexagon 46, which interacts with the internal hexagon 43 of the bush 42 and respectively with the internal hexagon 28 of the hub 16 of the compressor wheel 14 (FIG. 4). The outside diameter 45 of the socket wrench 27 corresponds over part of its length with the through-bore 20 of the hub 16. In addition, the socket wrench 27 has an internal hexagon 47 on its side facing the compressor wheel 14, which internal hexagon 47 corresponds with the external hexagon 26 of the shaft end 19 (FIG. 3).

If the dismantling of the compressor wheel is necessary or if components arranged further on the inside, such as, for example, the bearings 48, have to be exchanged, first of all the filter muffler 36 is removed from the compressor casing 13. Then the screws 34 arranged between the air-outlet-side casing part 33 and the air-inlet-side casing part 32 are released and the air-inlet-side casing part 32 including the diffuser 17 is removed (FIG. 1). The mounting plate 38 is then screwed up in the tapped holes 37 of the air-outlet-side casing 33, whereupon the locking sleeve 29 is inserted through the central recess 41 or the bush 42 of the mounting plate 38 into the compressor wheel 14 (FIG. 3, FIG. 4). In the process, the external hexagon 46 of the locking sleeve 29 comes into engagement with the internal hexagon 28 of the hub 16 and respectively with the internal hexagon 43 of the bush 42, so that the compressor wheel 14 is locked against rotation. The socket wrench 27 is then inserted through the locking sleeve 29 into the compressor wheel 14 until it encloses the external hexagon 26 of the shaft end 19 with its internal hexagon 47 (FIG. 3, top). Of course, the socket wrench 27 may also be inserted into the compressor wheel 14 at the same time as the locking sleeve 29.

The shaft/hub connection is then released by turning the socket wrench 27 until the compressor wheel 14 is contiguous to the mounting/dismantling device 39 and respectively to the bush 42 of the mounting plate 38 (FIG. 3, FIG. 4, but at the bottom). The mounting plate 38 is then separated from the air-outlet-side casing part 33 by releasing the screws 49 attached between the fastening holes 40 and the tapped hole 37. In the process, both the locking sleeve 29 and the socket wrench 27 are pulled off the compressor wheel 14. Once the compressor wheel 14 has been removed, components, such as the bearings 48 for example, arranged further in the interior of the exhaust-gas turbocharger are also accessible. Depending on requirement, these inner components, in addition to the compressor wheel 14, can thus also be dismantled from the compressor side. During the mounting of the compressor wheel 14, the said steps of the method take place in the reverse order.

Since in particular the second locating feature, in addition to the first, is also arranged in the interior of the hub 16 and the outside diameter 45 of the socket wrench 27 corresponds over part of its length with the through-bore 20 of the hub 16, the compressor wheel, after being detached from the turbocharger shaft and after the mounting plate 38 is separated 38 from the air-outlet-side casing part 33, can also be removed from the exhaust-gas turbocharger together with the mounting/dismantling device 39. This results in a rigid, i.e. relatively robust, combination of compressor wheel 14 and mounting/dismantling device 39, which combination can both be advantageously removed from the exhaust-gas turbocharger and inserted into the latter again.

In a second exemplary embodiment, the turning device 27 is connected to a step-up gear 50 on its side remote from the hub 16. To this end, the socket wrench 27 has an internal square 51 on its side remote from the compressor wheel 14, in which internal square 51 a corresponding journal 52 of the step-up gear 50 engages. The step-up gear 50 has a locking stirrup 54 fastened in a cutout 53 of the mounting plate 38. In addition, the mounting plate 38 is connected to a lifting and transporting device 55. To this end, it has a plurality of fastening holes 56 in its radially outer region for accommodating releasable connecting elements 57, designed as screws, for the lifting and transporting device 55 (FIG. 3).

This mounting/dismantling device 39 is suitable in particular for larger exhaust-gas turbochargers, i.e. relatively heavy compressor wheels 14. In this case, the dismantling is effected essentially as in the first exemplary embodiment. However, the socket wrench 27 is connected to the step-up gear 50 after being inserted into the compressor wheel 14. The step-up gear 50 is secured by means of its locking stirrup 54 in the cutout 53 of the mounting plate 38 and is thus locked against rotation. Depending on the design, the torque for detaching the compressor wheel 14 and thus the requisite expenditure of force can be reduced five-fold to 25-fold with such a step-up gear 50. After the compressor wheel 14 is detached, the step-up gear 50 is removed again and the compressor wheel 14, as in the first exemplary embodiment, is separated from the turbocharger shaft 6 by means of the socket wrench 27.

As already likewise described in the first exemplary embodiment, the mounting plate 38 is now removed from the air-outlet-side casing part 33 of the compressor casing 13. The mounting plate 38 is screwed to the lifting and transporting device 55 and finally the compressor wheel 14 is withdrawn from the exhaust-gas turbocharger by means of the lifting and transporting device 55. In the process, the entire mounting/dismantling device in turn serves as a transport unit to withdraw the compressor. In this exemplary embodiment, too, the mounting of the compressor wheel 14 is effected in the reverse order of the said steps of the method.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for mounting/dismantling a compressor-wheel arrangement turbochargers using a mounting/dismantling device, the compressor-wheel arrangement comprising:

a compressor casing connected to a turbine casing and a compressor wheel which is connected to a turbine wheel via a turbocharger shaft, the compressor wheel including a hub having a multiplicity of moving blades, the hub having a central through-bore accommodating a shaft end of the turbocharger shaft, and a fastening thread for the hub being formed on the shaft end, the hub having a turbine-side fastening socket and an integrated internal thread which corresponds with the fastening thread of the shaft end in which a guide surface is formed in both the internal thread and the fastening thread, and the guide surfaces of the fastening socket correspond with the guide surfaces of the shaft end, the compressor casing including at least one air-inlet-side casing part and at least one air-outlet-side casing part, and a plurality of fastening elements releasably arranged between both casing parts, a first locating feature for the mounting/dismantling device of the compressor wheel being arranged on the shaft end, a second locating feature for the mounting/dismantling device being arranged on the compressor wheel, and a third locating feature for the mounting/dismantling device being arranged on the air-outlet-side casing part, the mounting/dismantling device comprising a mounting plate, a locking device, and a turning device, the mounting plate having a plurality of fastening holes in its radially outer region for the air-outlet-side casing part of the compressor and a central recess for accommodating the locking device and the turning device, and a bush fastened in said central recess for accommodating the locking device in the mounting plate, wherein the method comprises the steps of:

a) during the dismantling, first releasing all the fastening elements from the air-outlet-side casing part and the air-inlet-side casing part and removing the air-inlet-side casing part;

b) thereafter fastening the mounting plate to the air-outlet-side casing part;

c) thereafter locking the compressor wheel with the locking device;

d) thereafter releasing the shaft/hub connection with the turning device;

e) thereafter separating the mounting plate from the air-outlet-side casing part, wherein both the locking device and the turning device are pulled off the compressor wheel and the compressor wheel is removed, and;

f) repeating steps a)–e) in reverse order during mounting.

2. The mounting/dismantling method as claimed in claim 1, wherein the step of releasing the shaft/hub connection further comprises turning the turbocharger shaft and locking the compressor wheel.

3. The mounting/dismantling method as claimed in claim 1, wherein the step of releasing the shaft/hub connection further comprises turning the compressor wheel and locking the turbocharger shaft.

4. The mounting/dismantling method as claimed in claim 2, wherein when the compressor wheel is a heavy compressor wheel, the mounting plate is connected to a lifting and transporting device after being separated from the air-outlet-side casing part, both the locking device and the turning device remain on the compressor wheel, the compressor wheel including the entire mounting/dismantling device is removed by means of the lifting and transporting device and is only then separated from both devices.

* * * * *